United States Patent
Dixon et al.

(10) Patent No.: US 10,362,768 B2
(45) Date of Patent: Jul. 30, 2019

(54) EXTRUDED ANIMAL LITTERS

(75) Inventors: Dan Kenneth Dixon, St. Louis, MO (US); Nathan Foster Huck, Jackson, MO (US)

(73) Assignee: SOCIÉTÉ DES PRODUCTS NESTLÉ S.A., Vevey (CH)

(*) Notice: Subject to any disclaimer, the term of this patent is extended or adjusted under 35 U.S.C. 154(b) by 526 days.

(21) Appl. No.: 12/931,246

(22) Filed: Jan. 27, 2011

(65) Prior Publication Data

US 2011/0185977 A1     Aug. 4, 2011

Related U.S. Application Data

(60) Provisional application No. 61/337,019, filed on Jan. 29, 2010.

(51) Int. Cl.
*A01K 29/00* (2006.01)
*B28C 5/46* (2006.01)

(52) U.S. Cl.
CPC ............ *A01K 29/00* (2013.01); *B28C 5/46* (2013.01)

(58) Field of Classification Search
CPC ........................................... A01K 1/0152
USPC .................................... 119/171, 173
See application file for complete search history.

(56) References Cited

U.S. PATENT DOCUMENTS

| | | |
|---|---|---|
| 768,531 A | 8/1904 | Kirby |
| 3,923,005 A | 12/1975 | Fry et al. |
| 3,954,086 A | 5/1976 | Maness |
| 4,206,718 A * | 6/1980 | Brewer ............ A01K 1/0155 119/171 |
| 4,627,382 A | 12/1986 | Muzzey |
| 4,873,811 A | 10/1989 | Izumitani et al. |
| 4,881,490 A * | 11/1989 | Ducharme et al. ........ 119/173 |
| 4,883,021 A | 11/1989 | Ducharme et al. |
| 4,914,066 A | 4/1990 | Woodrum |
| 4,929,474 A | 5/1990 | Avni et al. |
| 4,949,672 A | 8/1990 | Ratcliff et al. |
| 5,035,205 A | 7/1991 | Schiller et al. |
| 5,176,107 A | 1/1993 | Buschur |
| 5,293,837 A | 3/1994 | Caldwell |
| 5,452,684 A | 9/1995 | Elazier-Davis et al. |
| 5,577,463 A | 11/1996 | Elazier-Davis et al. |
| 5,636,594 A | 6/1997 | Pina |
| 5,775,259 A | 7/1998 | Tucker |
| 5,806,462 A * | 9/1998 | Parr ........................ 119/173 |
| 5,860,391 A | 1/1999 | Maxwell et al. |
| 5,901,661 A * | 5/1999 | Pattengill et al. ........... 119/173 |
| 6,029,603 A | 2/2000 | Evans et al. |
| 6,095,088 A | 8/2000 | Savicki |
| 6,220,206 B1 | 4/2001 | Sotillo et al. |
| 6,276,300 B1 | 8/2001 | Lewis, II et al. |
| 6,287,550 B1 | 9/2001 | Trinh et al. |
| 6,524,603 B1 * | 2/2003 | Smith et al. .............. 424/406 |
| 6,543,385 B2 | 4/2003 | Raymond et al. |
| 6,578,521 B2 | 6/2003 | Raymond et al. |
| 6,837,181 B2 | 1/2005 | Schulein, Jr. et al. |
| 6,860,233 B2 | 3/2005 | Buttersack et al. |
| 6,860,234 B2 | 3/2005 | Raymond et al. |
| 6,887,570 B2 | 5/2005 | Greene et al. |
| 6,955,136 B2 | 10/2005 | Schulein, Jr. |
| 6,962,129 B1 * | 11/2005 | Lawson .................... 119/173 |
| 7,228,819 B1 | 6/2007 | Wang et al. |
| 7,290,499 B2 | 11/2007 | Emery |
| 7,316,201 B2 | 1/2008 | Rasner et al. |
| 7,331,309 B2 | 2/2008 | Burckbuchler, Jr. |
| 7,429,421 B2 | 9/2008 | Greene et al. |
| 7,523,973 B2 | 4/2009 | Lin et al. |
| 7,533,630 B2 | 5/2009 | Steckel et al. |
| 7,603,964 B2 | 10/2009 | Jenkins et al. |
| 7,628,118 B1 | 12/2009 | Nottingham et al. |
| 7,757,638 B2 * | 7/2010 | Wang et al. .............. 119/173 |
| 7,895,976 B2 * | 3/2011 | Ikegami et al. ........... 119/171 |
| 8,074,604 B2 * | 12/2011 | Swank ...................... 119/171 |
| 2004/0163604 A1 | 8/2004 | Kirk et al. |
| 2005/0005869 A1 | 1/2005 | Fritter et al. |
| 2005/0132968 A1 * | 6/2005 | Swank ...................... 119/171 |
| 2006/0196438 A1 | 9/2006 | Caputa et al. |
| 2007/0277740 A1 | 12/2007 | Delman et al. |
| 2008/0087226 A1 * | 4/2008 | Steckel et al. ............. 119/173 |
| 2008/0223302 A1 * | 9/2008 | Wang et al. .............. 119/173 |
| 2009/0000560 A1 | 1/2009 | Matsuo et al. |
| 2009/0000562 A1 * | 1/2009 | Jenkins et al. ............ 119/173 |
| 2009/0250014 A1 | 10/2009 | Juan |
| 2009/0272327 A1 | 11/2009 | Plante |
| 2009/0308323 A1 | 12/2009 | Van Nieuwenhuijzen-Van Rooijen et al. |

(Continued)

FOREIGN PATENT DOCUMENTS

| | | |
|---|---|---|
| JP | 2005021071 | 1/2005 |
| JP | 2006042798 | 2/2006 |
| WO | 2009133212 A1 | 11/2009 |

OTHER PUBLICATIONS

New World Encyclopedia, Apr. 2009, (Year: 2009).*

(Continued)

*Primary Examiner* — Kristen C Hayes

(57) ABSTRACT

The invention provides extruded animal litters and methods of making and using such litters. The animal litters comprise an extruded mixture of from about 10 to about 90% of one or more clays and from about 90 to about 10% of one or more starches. The use of starches to produce the extruded litters result in litters that are less dense than conventional clay-based animal litters and are therefore easier to transport and use.

7 Claims, No Drawings

(56) References Cited

U.S. PATENT DOCUMENTS

2012/0012064 A1* 1/2012 Jenkins et al. ................ 119/171

OTHER PUBLICATIONS

Carrión et al., Animal Feed Science and Technology 165 (2011) 79-84.
Carvalho et al., Animal Feed Science and Technology 119 (2005) 171-178.
Sundu et al., Worlds Poultry Science Journal 62(2) (2006) 316-325.
Fu, Qingwei, "Preparation and Study on the Performances of Starch-based Biodegradable Foams," Tianjin University, China Master's Theses Full-text Database, Jan. 2007 (Engish translation).

* cited by examiner

EXTRUDED ANIMAL LITTERS

CROSS REFERENCE TO RELATED APPLICATIONS

This application claims priority to U.S. Provisional Application Ser. No. 61/337,019 filed Jan. 29, 2010, the disclosure of which is incorporated herein by this reference.

BACKGROUND OF THE INVENTION

1. Field of the Invention

The invention relates generally to animal litters and particularly to extruded animal litters having improved physical, functional, and related properties.

2. Description of Related Art

Conventional clay-based compositions used as animal litters represent a significant portion of the animal litter market, e.g., litter for cats, dogs, rabbits, gerbils, and other small animals. However, the relatively high density of clay used to produce the litters make the litters heavy and awkward to handle and transport, particularly in the large quantities. In addition, clay litters are not readily biodegradable and are prone to produce dust that contaminates the environment, particularly when tracked from a litter box, by an animal using the litters. These conventional clay-based animal litters are typically made from non-swelling clays, swelling clays, or combinations thereof and are sold in the form of non-clumping litters and clumping litters.

Non-clumping animal litters are typically made by formulating non-swelling clays into animal litter particles. Such litters and methods for making such litters are known in the art. U.S. Pat. No. 4,949,672 discloses boron-based odor control animal litters comprising clay with absorbed solution of boron compounds in an aqueous alkali metal hydroxide. U.S. Pat. No. 7,228,819 discloses magnetically-attractable non-clumping animal litters comprising non-clumping absorbent particulate material and magnetically attractable metal particles bound together. U.S. Pat. No. 7,316,201 discloses a non-clumping animal litter that contains absorbent fibers, zeolite, mineral fillers, and binders. Non-clumping liters made from non-clay materials are also known e.g., U.S. Pat. No. 6,276,300 discloses animal litters comprising paper, sphagnum moss, zeolite molecular sieve and optionally sawdust. Many such litters are known in the art.

Clumping animal litters are typically made by coating a non-swelling clay or other material with a swelling clay such as bentonite, e.g., a non-swelling clay or agglomerated non-swelling clay particles (clay fines) coated with bentonite. Such litters and methods for making such litters are known in the art. U.S. Pat. No. 6,887,570 discloses coated clumping litter particles useful for the control and removal of animal waste. In one embodiment, the particles comprise non-swelling clay particles with swelling clay particles coated onto the non-swelling particles. U.S. Pat. No. 7,429,421 discloses coated clumping litter comprising non-swelling particles. U.S. Pat. No. 7,331,309 discloses clumping animal litters that forms solid clumps upon contact with aqueous solution. The litter contains an absorbent polymer and a gum and grist that form a homogenous mixture in which hydration with aqueous solution forms instantaneous clumps.

Additionally, animal litters made by processes that involve extrusion are known in the art. U.S. Pat. No. 3,923,005 discloses an animal litter comprising alfalfa and starch that is made using an extrusion process. U.S. Pat. No. 4,206,718 discloses a process for producing light weight animal litter from ground alfalfa and gelatinisable flour or starch. In one embodiment, the litters contain up to 10% bentonite as a binder. U.S. Pat. Nos. 5,452,684 and 5,577,463 disclose an animal litter comprising an extruded smectite clay that forms stronger clumps when wetted with animal urine. U.S. Pat. No. 7,603,964 discloses mixing a clay materials and a light-weighting material and forming the mixture into a composite particle using various methods such as agglomeration, compaction, and extrusion. WO2009133212A1 discloses methods for producing low-density agglomerated pet litters using minerals with an attapulgite content greater than 50% and an extrusion process.

Generally, all these litters function for their intended purpose, e.g., managing animal urine and feces. Further, the litters may, in some circumstances, be used for other purposes, e.g., absorbing environmental contaminants. However, as stated, these litters are made mostly from dense clays that are relatively difficult and expensive to handle and transport. Additionally, these litters are often inadequate for some functions, e.g., dust control. Therefore, there is a need for new litters and methods for making new litters that have improved physical, functional, and related properties, e.g., animal litters that are easier and less expensive for the manufacturer and the consumer to handle and transport.

SUMMARY OF THE INVENTION

It is, therefore, an object of the invention to provide animal litters having improved physical, functional, or related properties when compared to conventional clay-based animal litters.

It is another object of the invention to provide animal litters that are less dense and therefore weigh less than conventional clay-based animal litters.

It is another object of the invention to provide animal litters that are easier and less expensive to handle and transport than conventional clay-based animal litters.

It is a further object of the invention to provide animal litters that produce less dust than conventional clay-based animal litters.

It is another object of the invention to provide animal litters that are more biodegradable than conventional clay-based animal litters.

These and other objects are achieved using extruded animal litters comprising from about 10 to about 90% of or more clays and from about 90 to about 10% of one or more starches.

Additional and further objects, features, and advantages of the invention will be readily apparent to those skilled in the art.

DETAILED DESCRIPTION OF THE INVENTION

Definitions

The term "animal litter(s)" means a composition that is suitable for use as an animal litter (e.g., managing animal waste) but that can also be used for any other suitable purpose. For example, an animal litter of the invention could be used to absorb a chemical spill, absorb an oil spill, create traction on a slippery surface, and the like.

All percentages expressed herein are by weight of the total weight of the composition unless expressed otherwise.

As used throughout, ranges are used herein in shorthand, so as to avoid having to set out at length and describe each and every value within the range. Any appropriate value within the range can be selected, where appropriate, as the upper value, lower value, or the terminus of the range.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a clay" or "a method" includes a plurality of such "clays" or "methods". Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

The Invention

In one aspect, the invention provides animal litters. The animal litters comprise an extruded mixture comprising from about 10 to about 90% of or more clays and from about 90 to about 10% of one or more starches. The invention is based upon the discovery that these extruded animal litter compositions have several surprising characteristics. The litters have a relatively low density when compared to conventional clay-based animal litters, i.e., the litters weigh less per unit volume and are therefore easier to handle and transport.

Additionally, the extrusion process produces animal litters that have a "film" on the surface of the litters. In conventional extrusion processes for food products, the surface of the product is porous. In the invention, the use of clay fills the pours at the surface and creates the film. This film helps prevent the clay in the litter from forming dust particles that contaminate the environment, particularly when tracked into the environment by an animal using the litter. While not bound by theory, the film is believed to be formed when the clay and starch gelatinize and produce a film of clay and starch on the surface of the litter. Further, the use of clay creates a greater honeycomb structure in the interior of the animal litters. This structure helps reduce the density of the litter composition.

In addition, the use of starch in the compositions makes the litters more biodegradable than conventional clay-based litter compositions, i.e., the starch in the litters will be degraded in the environment.

The clays useful in the invention are any clays useful for forming animal litters, particularly in the extrusion methods described herein. In various embodiments, the clays are non-swelling clays, swelling clays, or combinations thereof. The clays can be clays that are obtained directly by mining natural clay deposits, synthetic clays, or clays that are derived from the agglomeration of clay particles, e.g., clay particles (e.g., clay fines) produced by litter or other manufacturing processes that involve the use of clays.

Non-swelling clays include kaolinites, illites, vermiculites, attapulgites, sepiolites, and non-swelling smectites. In preferred embodiments, the non-swelling clays are rich in the following clay minerals: palygorskite sepiolite, kaolinite, dickite, nacrite, illite, glauconite, celadonite, and phengite. Most preferably, the non-swelling clays contain the clay minerals Ca-montmorillonite, kaolinite, and illite.

Swelling clays include smectites and swelling forms of kaolinites, illites, and vermiculites. In preferred embodiments, the swelling clays contain the following clay minerals: hectorite, beidelite, montmorillonite, nontronite, saponite, sauconite, vermiculite, and halloysite. More preferably, the clay is bentonite, e.g., a Na-montmorillonite (Na-bentonite). Generally, bentonite is a naturally occurring combination of clay minerals and some non-clay mineral constituents. Na-bentonite is rich in Na-montmorillonite but may also include other clay and some non-clay mineral constituents. In various embodiments, the swelling clays contain Na-montmorillonite, hectorite, and vermiculite.

When used in combination, the non-swelling and swelling clays can be mixed in any amount suitable for forming the animal litters. Generally, the non-swelling and swelling clays can be mixed in amounts of from about 10 to about 90% non-swelling clay and from about 90 to about 10% swelling clay.

The starches useful in the invention are any starches useful for forming animal litters, particularly in the extrusion methods described herein. In various embodiments, the starches comprise amylose and/or amylopectin, e.g., glycogen. The starches can be purified starches such as glycogen or starches derived from natural sources such as wheat flour, sorghum, bananas, potatoes, rice, corn, or wheat. In various embodiments, when starch is derived from a natural source such as corn, the starch source is simply mixed with the clay and process according to the methods described herein. In preferred embodiments, the starch source is ground to a fine particle size before mixing with the clay, e.g., particle sizes of from about 10 to about 150 mesh. When starch is derived from a natural source, the amount of starch in the source must be taken into account when calculating the amount of the source to include in the formulation for the litter. Each such starch source has a chemical balance of starch, protein, fat, and fiber. While purified starch may be used, it is more cost effective to use native grains. In this situation, the formula used to make the animal litter can be adjusted to obtain the desired amount of starch using methods known to skilled artisans.

The total starch must be within the range for the litter as given, i.e., 10 to 90%. In preferred embodiments, the starches are starches derived from natural sources. Most preferably, the starches are starches in potatoes, corn, rice, and wheat.

The clay and starch are mixed in any amounts from about 10% to about 90% clay to about 90 to about 10% starch, preferably from about 20 to about 80% and from about 80 to about 20%, most preferably from about 30 to about 70% and from about 70 to about 30%. In one embodiment, the litter comprises about 50% clay and about 30% starch, with the remainder being other ingredients characteristic of the starch source or other added ingredients that improve the litter (e.g., odor control agents or antimicrobials) or the method for making the litter (e.g., lubricants).

The animal litters of the invention have a density of from about 10 to about 40 pounds per cubic foot (lbs/ft$^3$), (169 to 641 kilograms per cubic meter (kg/m$^3$)), preferably from about 16 to about 36 lbs/ft$^3$, (256 to 577 kg/m$^3$), most preferably from about 20 to about 32 lbs/ft$^3$, (320 to 513 kg/m³). Typical conventional clay-based animal litters have a density of from about 40 to about 60 lbs/ft³, (641 to 961 kg/m³). Therefore, the animal litters of the invention have a density that is less than that of conventional clay-based animal litters. The extruded litters are therefore less expensive for manufacturers and consumers to handle and transport. Further, the litters are more biodegradable because of the presence of the starch. In addition, the extruded litters have similar or superior properties when compared to conventional litters, e.g., the extruded litters absorb moisture and control odors similar to conventional clay-based litters. The decrease in density reduces the amount of total mass that must be transported and disposed in landfills.

In one embodiment, the litters further comprise one or more lubricants. The lubricants can be any lubricant that alters the properties of the mixture such that the mixture incurs less friction during the extrusion process. Having less friction during extrusion means that the mixture can move through the extruder in less time and increase the rate of production of the litter compared to a mixture without lubricants. The lubricants are added in amounts of from about 0.5 to about 8%, preferably from about 1 to about 6%, most preferably from about 2 to about 4%. Any lubricant that lowers the friction of the mixture can be used. Lubricants useful in the invention include mineral oil, vegetable oil, tallow, and the like.

In another embodiment, the litters further comprise one or more plasticizers. The plasticizers can be any plasticizer that alters the properties of the mixture by increasing the plasticity or fluidity of the mixture, alters the starch's viscosity, or alters the swelling or gelatinization of the starch. A mixture with increased plasticity or fluidity can move through the extruder in less time and increase the rate of production of the litter compared to a mixture without the plasticizers. Similarly, altering the starch properties modifies the animal litter produced by the method, e.g., makes the litter more or less dense or alters the crush strength of the litter. The plasticizers are added in amounts of from about 2 to about 20%, preferably from about 4 to about 16%, most preferably from about 6 to about 12%.

Any plasticizer that increases the plasticity or fluidity of the mixture can be used. Plasticizers useful in the invention include polyols such as glycerol, propylene glycol or sorbitol. Many such plasticizers are known to skilled artisans. In one embodiment, the plasticizer is glycerol and in another the plasticizer is a combination of glycerol, sorbitol, and hydrogenated corn syrups.

In a further embodiment, the litters further comprise one or more binders. The binders can be any binder that alters the properties of the mixture such that the mixture results in a litter that has desirable crush strength. Having different binders that alter the crush strength means that the mixture can be used to produce litters with different physical properties that meet the needs of litters to be used in different situations, e.g., based on animal size, animal type, indoor versus outdoor use, and the like. The binders are added in amounts of from about 1 to about 12%, preferably from about 2 to about 8%, most preferably from about 3 to about 6%.

Any binder that lowers or alters the crush strength of the litter can be used. Binders useful in the invention include gums, starches, pectins, agar agar, gelatin, alginates, carrageenans, and proteins. Specific examples include locust bean gum, xanthan gum, arabic gum, cassia gum, gelatin, wheat gluten, blood plasma, soy protein, and dairy proteins. Preferred binders include guar and carboxymethylcellulose (CMC).

In additional embodiments, the litters further comprise at least two of one or more lubricants, one or more plasticizers, and one or more binders in any and various combinations. The lubricants, plasticizers, and binders are added to the clay and starch mixture in amounts that achieve the benefits described herein. Generally, the lubricants, plasticizers, and binders are added individually. In one embodiment, the lubricants, plasticizers, and binders are mixed before being added to the mixture. In another, the lubricants and plasticizers are mixed before addition and the binders are added individually. Any such combination is encompassed in the invention.

The litters may contain additional performance enhancing materials that improve the functional properties of the compositions. Many such materials are known in the art. For example, US20050005869 and its related patent applications discloses many such performance enhancing materials and methods for using the materials with absorbent compositions, e.g., antimicrobials, odor reducing materials, fragrances, health indicating materials, color altering agents, dust reducing agents, nonstick release agents, superabsorbent materials, cyclodextrins, zeolites, activated carbons, pH altering agents, salt forming materials, ricinoleates, and mixtures thereof. U.S. Pat. No. 7,533,630 discloses functional agents useful detecting presence of sugar in urine and detecting diabetes.

In one embodiment, the litters contain activated carbon. Activated carbon is known to be a good absorber of organic materials that may be responsible for malodors. For example, U.S. Pat. No. 5,860,391 discloses absorbents containing activated carbon for odor control. U.S. Pat. No. 6,287,550 discloses compositions for reducing malodors that contain activated carbon. When used, activated carbon is added to the animal litters in amounts of from about 0.01 to about 6%, preferably from about 2 to about 5%, most preferably from about 3 to about 4%.

In another embodiment, the litters contain baking soda. Baking soda is known to be a good absorber of organic materials that may be responsible for malodors. Use if baking soda to control animal waste is known, e.g., U.S. Pat. Nos. 6,955,136 and 6,837,181. When used, baking soda is added to the animal litters of the present invention in amounts of from about 0.01 to about 6%, preferably from about 0.05 to about 5%, most preferably from about 2 to about 4%.

In other embodiments, the litters further comprise a partial or complete coating of one or more swelling clays. Coating the litters with swelling clays imparts a clumping property to the litters while still retaining most of the advantages of the litters, e.g., a lower density that conventional clay-based litters. The swelling clays are coated onto the litters in amounts that comprise from about 5 to about 40% of the litter, preferably from about 10 to about 45%, most preferably from about 15 to about 30%. Methods for coating the litters and methods for producing clumping animal litters are known in the art, e.g., U.S. Pat. No. 6,887,570. In one embodiment, animal litter particles of the present invention are placed in a rollermill with one or more swelling (clumping) clays and the particles are mixed with the clays until the particles have a coating of the clays in the required range, preferably about 30%. In one embodiment, the swelling clay is bentonite.

Other advantages of the invention include having an animal litter that has relatively low dust compared to conventional clay-based litters and that has a formulation that provides the flexibility to modify shapes, maximize animal acceptance, improve odor control, lessen scattering and tracking, and maximize caregiver appeal.

While not being bound by theory, it is believed that the extrusion process causes the starch to expand thus creating expanded cellular structure in the litter with cells that are less dense than the clays alone. This decreases the density of the litter without adversely affecting the ability of the material to function as an animal litter. Further, the starch produces a composition that does not break apart to produce dust or clay fines, e.g., the starch produces a skin on the animal litter that maintains its integrity when handled and therefore does not produce small particles of the inventive animal litter.

In another aspect, the invention provides animal litters comprising a combination of an animal litter of the invention and one or more different compounds, compositions, or other materials that function as an animal litter. Such materials include conventional clay-based animal litters (clumping or non-clumping), corncobs, sawdust, wood, paper, silica gel (e.g., U.S. Pat. Nos. 6,860,234, 6,543,385, and 6,578,521), sunflower seeds, and the like. Many such animal litters are known to skilled artisans. In a preferred embodiment, the material is a different litter made from swelling clay, non-swelling clay, silica gel, or combination thereof. The animal litters of the invention can be combined with such other materials in any suitable amount to produce the combination. The combination is made by mixing the litter of the invention with the other materials. Generally, the animal litters of the invention comprise from about 5 to about 95% of the mixture, preferably from about 10 to about 90%. In one embodiment, the mixture comprises about 50% of the animal litter of the present invention and about 50% of silica gel, clumping animal litter, non-clumping animal litter, or combination thereof. In another embodiment, the mixture comprises about 90% of the animal litter of the present invention and about 10% silica gel. In a further embodiment, the mixture comprises about 70% of the animal litter of the present invention and about 30% clumping litter.

In a further aspect, the invention provides methods for making animal litters. The methods comprise:
  creating a mixture comprising from about 10 to about 90% of or more clays and from about 90 to about 10% of one or more starches;
  adjusting the moisture content of the mixture to from about 5% to about 30%, if required; and
  extruding the mixture at a pressure of from about 200 to about 1200 pounds per square inch (psi) and a temperature of from about 200 to about 350° F. (93 to 177° C.).

The mixture of clays and starches is created using any suitable method and equipment. Typically, the clay and starch are simply mixed and stirred, preferably until homogeneous, using any suitable equipment, e.g., a mixer. The clays and starches useful in the method are described herein for the animal litter compositions of the invention. In preferred embodiments, the clays and starches have a particles size of from about 10 to about 200 mesh, preferably from about 20 to 150 mesh, most preferably from about 30 to 100 mesh. However, any suitable particle size can be used as long as it is compatible with the equipment being used to produce the litters.

The moisture content of the mixture is adjusted only if the inherent moisture content of the mixture is outside the given range. If the moisture in the clay and starch create a mixture with a moisture content in the given range, no adjustment to the moisture content is required. If required, the moisture content of the mixture is adjusted using any suitable method and equipment. Typically, water is added to the clay and starch mixture while stirring in amounts required to reach the desirable moisture level. The resulting mixture is suitable for extrusion.

The resulting mixture is extruded using any suitable method and equipment. Suitable extruders and related equipment are commercially available and known in the art. Typical extruders include single and twin-screw extruders sold by Wenger and similar manufactures. Extruders and their use for manufacturing foods, plastics, and numerous materials are known to skilled artisans, e.g., animal litter density, size, and image are all impacted by the set up of the equipment and processing conditions. Any extrusion feed rate compatible with the mixture and the equipment can be used. Generally, the mixture is fed through the extruder at a rate of from about 10 to about 40 pounds per minute, preferably from about 12 to about 30 pounds per minute.

The extrusion is conducted at pressures of from about 200 to about 1200 psi, preferably from about 300 to about 1000 psi, most preferably from about 400 to about 800 psi.

The extrusion is conducted at temperatures of from about 200 to about 350° F. (93 to 177° C., preferably from about 220 to about 320° F. (104 to 160° C.), most preferably from about 240 to about 280° F. (116 to 138° C.).

When exiting the extruder, the litter may be cut into pieces of any suitable size and shape using any suitable equipment known to skilled artisans. Typically, the litter is cut using a rotating cutter knife and shaped into cylindrical pellets having a length of from about 0.5 to about 12 centimeters (cm) and a diameter of from about 0.3 to about 2.5 cm. Using appropriate dies, the litter can be shaped into any desirable form. Similarly, by varying the cutter speed, the litter can be sized as desirable for any particular use.

Although not required, the extruded animal litter may be dried to achieve a desirable moisture content for the litter. Therefore, in one embodiment, the methods further comprise drying the extruded animal litter to achieve a moisture content of from about 1 to about 14%, preferably from about 2 to about 12%, most preferably form about 3 to about 10%. Methods for drying the litter are known in the art, e.g., ovens and fans. In one embodiment, the animal litter is processed using a belt dryer to subject the litter to a temperature of about 175° F. (80° C.) for about 4 minutes to reduce the moisture to from about 4 to about 6%, preferably about 5%. Generally, drying conditions are dependent on formulation, density, production rates, and conditions.

In one embodiment, the methods further comprise adding one or more lubricants to the mixture before the mixture is extruded. The lubricants can be added at any suitable stage of the method before extrusion. Generally, the lubricants are added before the moisture is adjusted. However, the lubricants can be added after the moisture is adjusted. Useful lubricants and amounts of lubricants useful in the method are described herein for the animal litters of the invention.

In another embodiment, the methods further comprise adding one or more plasticizers to the mixture before the mixture is extruded. The plasticizers can be added at any suitable stage of the method before extrusion. Generally, the plasticizers are added before the moisture is adjusted. However, the plasticizers can be added after the moisture is adjusted. Useful plasticizers and amounts of plasticizers useful in the method are described herein for the animal litters of the invention.

In a further embodiment, the methods further comprise adding one or more binders to the mixture before the mixture is extruded. The binders can be added at any suitable stage of the method before extrusion. Generally, the binders are added before the moisture is adjusted. However, the binders can be added after the moisture is adjusted. The binders can be added alone or can be added in a mixture with one or more of the lubricants or plasticizers. Useful binders and amounts of binders useful in the method are described herein for the animal litters of the invention.

In additional embodiments, the invention further comprises mixing one or more lubricants, one or more plasticizers, and one or more binders in any and various combinations and adding such mixture to the clay and starch mixture before the resulting mixture is extruded. For example, a combination of (1) lubricants and binders, (2) lubricants and plasticizers, (3) plasticizers and binders, and (4) lubricants, binders, and plasticizers can be added to the mixture as discussed. The lubricants, plasticizers, and binders are added to the clay and starch mixture in amounts and using methods described herein. The lubricants, plasticizers, and binders may be added at any suitable stage of the method before extrusion. Generally, the lubricants, plasticizers, and binders are added individually before the moisture is adjusted. However, the lubricants, plasticizers, and binders can be added after the moisture is adjusted. Or, one or more of the lubricants, plasticizers, and binders can be added before the moisture is adjusted and the other added after the moisture is adjusted. In one embodiment, the lubricants, plasticizers, and binders are mixed before being added to the mixture, either before or after the moisture is adjusted.

In another aspect, the invention provides animal litters made using the methods of the invention.

In another aspect, the invention provides an animal litter box comprising a device suitable for containing animal litter and suitable for use by an animal when excreting animal waste and one or more animal litters of the invention. The device is any device suitable for use by an animal and compatible with an animal litter of the invention. Many such devices are known in the art and available commercially, e.g., the litter boxes disclosed in US20090250014A1, US20090272327A1, US20090000560A1, US20070277740A1, U.S. Pat. No. 7,628,118, and the like.

In a further aspect, the invention provides kits suitable for containing animal litters useful for managing animal waste. The kits comprise in separate containers in a single package or in separate containers in a virtual package, as appropriate for the kit component, an animal litter of the invention and one or more of (1) a device suitable for containing the litter and suitable for use by an animal when excreting animal waste, e.g., a litter box; (2) a device suitable for handling animal waste that has been deposited with the litter, e.g., a scoop for removing animal feces from a litter (e.g., U.S. Pat. No. 7,523,973) or a rake suitable for arranging an animal litter in a litter box or other container; (3) a different animal litter, e.g., a different animal litter suitable for creating a mixture of the litter of the invention and such different animal litter; (4) instruction for how to use the litter to manage animal waste; and (5) instructions for how to dispose of the animal litter, e.g., how to dispose of the litter in an environmentally friendly manner, particularly after it has been used.

When the kit comprises a virtual package, the kit is limited to instructions in a virtual environment in combination with one or more physical kit components. The kits may contain the kit components in any of various combinations and/or mixtures. In one embodiment, the kit contains a package containing the litter and a scoop suitable for removing animal waste from the litter.

In another aspect, the invention provides packages comprising a material suitable for containing an animal litter of the present invention and a label affixed to the package containing a word or words, picture, design, acronym, slogan, phrase, or other device, or combination thereof, that indicates that the contents of the package contains an extruded animal litter of the present invention, e.g., information about the litter's density and/or its physical, functional, and related properties. Typically, such device comprises the words "extruded animal litter" or "low density animal litter" or an equivalent expression printed on the package. Any package or packaging material suitable for containing animal litters is useful in the invention, e.g., a bag, box, bottle, can, pouch, and the like manufactured from paper, plastic, foil, metal, and the like.

In another aspect, the invention provides a means for communicating information about or instructions for using an animal litter of the present invention for one or more of (1) managing animal waste such as animal urine and feces; (2) controlling odor; (3) controlling moisture; (4) controlling microorganisms; and (5) controlling dust. The means comprises a document, digital storage media, optical storage media, audio presentation, or visual display containing the information or instructions. In certain embodiments, the communication means is a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof. Useful information includes one or more of (1) methods and techniques for training or adapting an animal to use the litter, (2) functional or other properties of an animal litter of the invention, and (3) contact information for to use by a consumer or others if there is a question about the litter and its use. Useful instructions include methods for cleaning and disposing of the litter. The communication means is useful for instructing on the benefits of using the present invention and communicating the approved methods for using the invention for an animal.

In another aspect, the invention provides methods for managing animal waste. The methods comprise contacting the animal waste with an animal litter composition of the invention. Generally, the litter is placed in a litter box or other suitable container and the animal is allowed to deposit its waste (urine or feces) so that it comes in contact with the litter. If desirable, the litter can be placed on contact with the waste after the waste is deposited, e.g., on a lawn.

EXAMPLES

The invention can be further illustrated by the following examples, although it will be understood that the examples are included merely for purposes of illustration and are not intended to limit the scope of the invention unless otherwise specifically indicated.

Example 1

Animal Litter Production

An animal litter was made by mixing 99.5 pounds of ground corn (starch content of about 65%), 0.5 pounds of distilled monoglycerides, and 19 pounds of water in a paddle mixer. This mixture was then ground with a hammer mill through a $4/64"$ screen to reduce the particle size so that the mix could pass through the extruder die openings. The mixture was then fed at a rate of 14 pounds per minute into a twin screw extruder. Water at 0.56 pounds/minute and steam at 0.42 pounds/minute were injected into the extruder. The extruder screw speed was set at 350 rpm. The pressure at the discharge head of the extruder was measured at 750 psi and the internal product temperature varied in the range 220 to 270° F. (104 to 132° C.). The molten mixture was then extruded through circular die openings and cut into pellets by blades that swept across the face of the dies. The resulting pellets averaged 3/16 inch in diameter and 1/4 inch length. A pneumatic system was used to convey the pellets to a belt dryer. The dryer was set at 250° F. (121° C.) and the rate of the belt adjusted to allow a drying time of 3.6 minutes after which the product moisture dropped to 5%.

Example 2

Bulk Density Measurement

The bulk density of the animal litter from Example 1 was measured using a Seedburo® filling hopper (1¼ in diameter opening), stand, and pint sized (550.06 cm3 dry volume) sample cup. The litter pellets from Example 1 were poured into the filling hopper until it was full. Next, the empty pint cup was placed on a balance and the balance was zeroed. The cup was then placed beneath the filling hopper. The distance between the filling hopper discharge, and the top edge of the cup was set at 2 inches. The filling hopper discharge slide was then opened to allow product to fall into the empty sample cup. Pellets were allowed to flow until the cup was full, and then for an additional 1 to 2 seconds of overflow. A straight edge was then used to remove excess product from the top of the cup; leveling the cup contents with the rim of the cup. The cup with pellets was returned to the balance and the weight of the pellets per dry pint was recorded. Three determinations were made and the mean weight of the pellets was 177 grams in a dry pint. Finally the bulk density (mass per unit volume) value was converted to pounds per cubic foot (lb/ft$^3$) using the conversion factor 1 gram per cubic centimeter (gm/cm$^3$) equals 62.4269 lb/ft$^3$. For comparison, bulk densities of a conventional clay-based and a conventional paper-based litter were determined as above. The results are shown in Table 1. Referring to Table 1, it is clear that the animal litter of the invention was significantly less dense than the conventional litters.

Example 3

Animal Litter Absorption Capacity

The absorption capacity of the animal litter from Example 1 was determined by soaking the pellets in water over time intervals of 1, 5, 15, and 25 minutes and measuring the amount water retained at each interval. 10 g of pellets were accurately weighed in a four ounce size sample cup. Water was then added to fill the cup to within ½ in of the top. The mass of water added was recorded. The product was very buoyant thus another sample cup was used to press on any floating pellets to ensure that all are fully submerged. Care was taken to prevent any overflow. For each time interval, three separate measurements were made. The sample was allowed to soak for the designated time, and then the excess water was decanted and weighed. All masses were recorded in grams. The formula below was then used to calculate the percent absorption by mass:

$$\% \text{ Absorption by Mass} = \frac{(\text{Mass of total water added}) - (\text{Mass of excess water})}{\text{Sample Mass}}$$

The mean standard deviation of the three measurements at each time interval was calculated. For comparison, the absorption capacities of a conventional clay-based and a conventional paper-based litter were determined as above. The results are shown in Table 2. Referring to Table 2, the animal litter of Example 1 absorbed moisture comparable to conventional litters.

Example 4

Animal Litter with Water and Other Liquids 119 pounds of animal litter pellets were made using 99.5 pounds of ground corn, 0.5 pounds of distilled monoglycerides, 8 pounds of water, 9 pounds of glycerin, and 2 pounds of mineral oil, which were mixed in a paddle mixer. This mixture was then ground with a hammer mill through a 4/64" screen to reduce the particle size so that the mix could pass through the extruder die openings. The mixture was then fed at a rate of 14 pounds per minute into a twin screw extruder. Additional water (0.28 pounds/minute) and steam at 0.42 pounds/minute were injected into the extruder. The extruder screw speed was set at 350 rpm. The pressure at the discharge head of the extruder was measured at 750 psi and the internal product temperature varied in the range 220 to 270° F. (104 to 132° C.). The molten mixture was then extruded through circular die openings and cut into pellets by blades that swept across the face of the dies. The resulting pellets averaged 3/16 inch in diameter and 1/4 inch length. A pneumatic system was used to convey the pellets to a belt dryer. The dryer was set at 250° F. (121° C.) and the rate of the belt adjusted to allow a drying time of 3.6 minutes after which the product moisture dropped to 5%. The bulk density of the pellets was determined according to Example 2. The results are shown in Table 1. Referring to Table 1, the bulk density of the litter was significantly lower than that of the conventional litters used for comparison. The absorption capacity of the litter was determined according to Example 3. The results are shown in Table 2. Referring to Table 2, the absorption capacity of the animal litter was comparable to those of conventional litters.

Example 5

Animal Litter with 28% Na-Bentonite

The procedure in Example 1 was repeated except that 30 pounds of Na-bentonite and 69.5 pounds of ground corn were used instead of 99.5 pounds of ground corn. The bulk density of the litter was determined according to Example 2. The results are shown in Table 1. Referring to Table 1, the bulk density of litter was significantly lower than conventional litters used for comparison. The absorption capacity of the litter was determined according to Example 3. The results are shown in Table 2. Referring to Table 2, the absorption capacity of the animal litter was comparable to those of conventional litters.

Example 6

Animal Litter with 25% Na-Bentonite Plus Additional Liquids 119 pounds of animal litter were made according to Example 4 using 30 pounds of Na-bentonite, 69.5 pounds of ground corn, 0.5 pounds of distilled monoglycerides, 8 pounds of water, 9 pounds of glycerin, and 2 pounds of mineral oil, except that the discharge pressure was 900 psi at screw speeds of 350 rpm. The bulk density of the pellets was determined according to Example 2. The results are shown in Table 1. Referring to Table 1, the bulk density of the litter was significantly lower than that of the conventional litters used for comparison. The absorption capacity of the litter was determined according to Example 3. The results are shown in Table 2. Referring to Table 2, the absorption capacity of the animal litter was comparable to those of conventional litters.

Example 7

Animal Litter with 27.8% Na-Bentonite and 27.8% Ca-Montmorillonite Clay

The procedure in Example 1 was repeated except that 30 pounds of Na-bentonite, 30 pounds of non-swelling clay (Ca-Montmorillonite Clay), and 39.5 pounds of corn were used instead of 99.5 pounds of corn. The bulk density of the litter was determined according to Example 2. The results are shown in Table 1. Referring to Table 1, the bulk density of litter was significantly lower than conventional litters used for comparison. The absorption capacity of the litter was determined according to Example 3. The results are shown in Table 2. Referring to Table 2, the absorption capacity of the animal litter was comparable to those of conventional litters.

Example 8

Animal Litter with 50.4% Na-Bentonite Plus Additional Liquids 119 pounds of animal litter were made according to Example 4 using 60 pounds of Na-bentonite, 39.5 pounds of corn, 0.5 pounds of distilled monoglycerides, 8 pounds of water, 9 pounds of glycerin, and 2 pounds of mineral oil. The bulk density of the pellets was determined according to Example 2. The results are shown in Table 1. Referring to Table 1, the bulk density of the litter was significantly lower than that of the conventional litters used for comparison. The absorption capacity of the litter was determined according to Example 3. The results are shown in Table 2. Referring to Table 2, the absorption capacity of the animal litter was comparable to those of conventional litters.

Example 9

Animal Litter with 13.9% Na-Bentonite 13.9% Ca-Montmorillonite Clay

The procedure in Example 1 was repeated except that 15 pounds of Na-bentonite, 15 pounds of non-swelling clay (Ca-Montmorillonite Clay), and 69.5 pounds of corn were used instead of 99.5 pounds of corn. The bulk density of the litter was determined according to Example 2. The results are shown in Table 1. Referring to Table 1, the bulk density of litter was significantly lower than conventional litters used for comparison. The absorption capacity of the litter was determined according to Example 3. The results are shown in Table 2. Referring to Table 2, the absorption capacity of the animal litter was comparable to those of conventional litters.

Example 10

Animal Litter with 33.6% Ca-montmorillonite Plus Additional Liquids 119 pounds of animal litter were made according to Example 4 using 40 pounds of Ca-montmorilinite, 59.5 pounds of corn, 0.5 pounds of distilled monoglycerides, 8 pounds of water, 9 pounds of glycerin, and 2 pounds of mineral oil. The bulk density of the pellets was determined according to Example 2. The results are shown in Table 1. Referring to Table 1, the bulk density of the litter was significantly lower than that of the conventional litters used for comparison. The absorption capacity of the litter was determined according to Example 3. The results are shown in Table 2. Referring to Table 2, the absorption capacity of the animal litter was comparable to those of conventional litters.

TABLE 1

| Example | Bulk Density (lbs/ft$^3$) |
|---|---|
| 1 | 20.1 |
| 4 | 22.9 |
| 5 | 15.5 |
| 6 | 15.4 |
| 7 | 19.4 |
| 8 | 21.5 |
| 9 | 12.1 |
| 10 | 14.2 |
| Clay-based Litter[1] | 43.9 |
| Paper-based Litter[2] | 35.0 |

TABLE 2

| Example | Time Period (Minutes) | % Absorption Average | % Absorption St. Dev |
|---|---|---|---|
| 1 | 1 | 57.05% | 0.010 |
|   | 5 | 98.14% | 0.014 |
|   | 15 | 203.39% | 0.022 |
|   | 25 | 335.85% | 0.065 |
| 4 | 1 | 51.86% | 0.028 |
|   | 5 | 91.88% | 0.004 |
|   | 15 | 204.19% | 0.037 |
|   | 25 | 293.72% | 0.050 |
| 5 | 1 | 61.59% | 0.061 |
|   | 5 | 93.99% | 0.038 |
|   | 15 | 150.05% | 0.024 |
|   | 25 | 206.69% | 0.031 |
| 6 | 1 | 48.68% | 0.038 |
|   | 5 | 96.19% | 0.036 |
|   | 15 | 152.07% | 0.012 |
|   | 25 | 193.12% | 0.087 |
| 7 | 1 | 42.33% | 0.018 |
|   | 5 | 54.69% | 0.073 |
|   | 15 | 80.63% | 0.104 |
|   | 25 | 108.72% | 0.002 |
| 8 | 1 | 65.79% | 0.049 |
|   | 5 | 112.62% | 0.077 |
|   | 15 | 163.58% | 0.090 |
|   | 25 | 186.22% | 0.103 |
| 9 | 1 | 60.60% | 0.039 |
|   | 5 | 92.35% | 0.021 |
|   | 15 | 147.09% | 0.040 |
|   | 25 | 183.67% | 0.010 |
| 10 | 1 | 103.83% | 0.031 |
|   | 5 | 159.61% | 0.015 |
|   | 15 | 223.23% | 0.064 |
|   | 25 | 235.30% | 0.067 |
| Clay-based Litter[1] | 1 | 110.62% | 0.059 |
|   | 5 | 118.13% | 0.063 |

TABLE 2-continued

| Example | Time Period (Minutes) | % Absorption Average | % Absorption St. Dev |
|---|---|---|---|
| | 15 | 114.82% | 0.016 |
| | 25 | 123.51% | 0.116 |
| Paper-based Litter[2] | 1 | 58.44% | 0.015 |
| | 5 | 131.67% | 0.016 |
| | 15 | 197.44% | 0.089 |
| | 25 | 227.96% | 0.073 |

[1]Purina Tidy Cats Immediate Odor Control Formula (Non-Clumping)
[2]Purina Yesterday's News Regular Texture In the specification, there have been disclosed typical preferred embodiments of the invention and, although specific terms are employed, they are used in a generic and descriptive sense only and not for purposes of limitation. Obviously many modifications and variations of the invention are possible in light of the above teachings. It is therefore to be understood that the invention may be practiced otherwise than as specifically described.

Unless defined otherwise, all technical and scientific terms and any acronyms used herein have the same meanings as commonly understood by one of ordinary skill in the art in the field of this invention. Although any compositions, methods, and means for communicating information similar or equivalent to those described herein can be used to practice this invention, the preferred compositions, methods, and means for communicating information are described herein.

All references cited above are incorporated herein by reference to the extent allowed by law. The discussion of those references is intended merely to summarize the assertions made by their authors. No admission is made that any reference (or a portion of any reference) is relevant prior art. Applicants reserve the right to challenge the accuracy and pertinence of any cited reference.

What is claimed is:

1. An animal litter comprising from about 30 to about 70% of one or more clays and from about 70 to about 30% of one or more starches, wherein the starches have an expanded cellular structure.

2. An animal litter comprising about 50% of one or more clays and about 30% of one or more starches, wherein the starches have an expanded cellular structure.

3. The litter of claim 2 wherein the clay comprises a combination of non-swelling and swelling clays comprising from about 50% non-swelling clay and from about 50% swelling clay.

4. The litter of claim 1 wherein the starches are derived from corn.

5. The litter of claim 1 having a bulk density from about 12 lbs/ft$^3$ to about 23 lb/ft$^3$.

6. The litter of claim 1 further comprising one or more lubricants.

7. The litter of claim 6 wherein the lubricants are selected from the group consisting of mineral oil, vegetable oil, and tallow.

\* \* \* \* \*